(12) United States Patent
Bentz

(10) Patent No.: US 10,125,892 B2
(45) Date of Patent: Nov. 13, 2018

(54) SOLENOID VALVE DEVICE

(71) Applicant: Thomas Bentz, Stockton, CA (US)

(72) Inventor: Thomas Bentz, Stockton, CA (US)

( * ) Notice: Subject to any disclaimer, the term of this patent is extended or adjusted under 35 U.S.C. 154(b) by 77 days.

(21) Appl. No.: 15/180,883

(22) Filed: Jun. 13, 2016

(65) Prior Publication Data

US 2017/0356566 A1 Dec. 14, 2017

(51) Int. Cl.
*F16K 31/08* (2006.01)
*F16K 31/06* (2006.01)
*F16K 27/02* (2006.01)

(52) U.S. Cl.
CPC ........ *F16K 31/082* (2013.01); *F16K 27/0245* (2013.01); *F16K 31/0662* (2013.01)

(58) Field of Classification Search
CPC . F16K 31/082; F16K 31/0662; F16K 27/0245
USPC ................... 251/65, 129.02, 129.15
See application file for complete search history.

(56) References Cited

U.S. PATENT DOCUMENTS

| | | | | |
|---|---|---|---|---|
| 3,731,670 A * | 5/1973 | Loe | ........................... | A61F 6/24 128/831 |
| 3,751,086 A * | 8/1973 | Geringer | ............. | E05B 47/0002 251/65 |
| 3,789,876 A * | 2/1974 | Kempton | ............ | F16K 37/0033 137/554 |
| 3,795,383 A * | 3/1974 | Lombard | ................... | F16K 1/14 251/129.14 |
| 4,349,042 A * | 9/1982 | Shimizu | ................... | F16K 17/36 137/39 |
| 4,382,449 A * | 5/1983 | Nelson | ..................... | F16K 17/36 137/38 |
| 4,491,142 A * | 1/1985 | Shimizu | .................. | F16K 31/08 137/65 |
| 4,506,701 A * | 3/1985 | Masaki | ................. | F16K 31/082 137/596.17 |
| 4,630,799 A * | 12/1986 | Nolan | ................... | F16K 31/082 137/460 |
| 4,637,427 A * | 1/1987 | Nolan | ................... | F16K 31/082 137/460 |
| 4,640,303 A * | 2/1987 | Greenberg | ............ | F16K 17/366 137/38 |
| 4,750,705 A * | 6/1988 | Zippe | ..................... | F16K 31/003 137/248 |

(Continued)

*Primary Examiner* — Seth W Mackay-Smith
(74) *Attorney, Agent, or Firm* — Patentfile, LLC; Bradley C. Fach; Steven R. Kick

(57) ABSTRACT

In some embodiments, a solenoid valve device may include a body having a first fluid conduit, a second fluid conduit, and a chamber which may couple the first fluid conduit and a second fluid conduit together. A valve seat may be positioned within the chamber and all fluid passing through the chamber may be directed through the valve seat. A seal element may be movably positioned within the chamber and the seal element may be movable between a first position, in which the seal element is contacting the valve seat, and a second position, in which the seal element is not contacting the valve seat. A body magnet may motivate the seal element into the first position or the second position. Conversely, an electromagnet may overcome the magnetic communication of the body magnet and motivate the seal element into the second position or the first position.

10 Claims, 7 Drawing Sheets

(56) References Cited

U.S. PATENT DOCUMENTS

| | | | | |
|---|---|---|---|---|
| 4,770,389 | A * | 9/1988 | Bodine | E21B 34/04 |
| | | | | 251/129.04 |
| 5,160,036 | A * | 11/1992 | Childers | E02B 5/082 |
| | | | | 136/291 |
| 6,068,010 | A * | 5/2000 | Reinicke | B64G 1/26 |
| | | | | 137/1 |
| 6,085,772 | A * | 7/2000 | McGill | F16K 17/366 |
| | | | | 137/39 |
| 6,152,172 | A | 11/2000 | Christianson et al. | |
| 6,581,634 | B2 | 6/2003 | Najmolhoda et al. | |
| 7,004,446 | B2 | 2/2006 | Petro et al. | |
| 7,726,524 | B2 | 6/2010 | Merabet et al. | |
| 8,272,622 | B2 * | 9/2012 | Caldwell | F02M 51/0635 |
| | | | | 251/129.01 |
| 8,333,337 | B2 | 12/2012 | Nabih et al. | |
| 8,567,440 | B2 * | 10/2013 | Walter | F16K 31/0682 |
| | | | | 137/625.44 |
| 9,091,354 | B2 * | 7/2015 | Schlenker | F16K 15/183 |
| 9,897,224 | B2 * | 2/2018 | Neuhaus | F16K 31/0651 |
| 2002/0017324 | A1 | 2/2002 | Hisamura et al. | |
| 2006/0047360 | A1 * | 3/2006 | Burns, Sr. | G05D 7/0676 |
| | | | | 700/231 |

\* cited by examiner

SOLENOID VALVE DEVICE

FIELD OF THE INVENTION

This patent specification relates to the field of fluid control valves. More specifically, this patent specification relates to a magnetically operated low power solenoid fluid control valve.

BACKGROUND OF THE INVENTION

Solenoid fluid valves are used to control the flow of liquids for various applications. A fluid is a substance that continually deforms (flows) under an applied shear stress. Fluids are a subset of the phases of matter and include liquids, gases, plasmas and, to some extent, plastic solids. With the advent of microcontrollers and small single board computers, such as the Raspberry Pi and the like, the number of possible applications and uses for solenoid fluid valves is constantly increasing. However, existing solenoid valves have voltage and current requirements which exclude them from being used in certain applications. Existing low voltage solenoid valves are typically rated 12 or 24 volts DC, which cannot be directly connected to a microcontroller. A typical solenoid valve normally requires higher voltage relative to a microcontroller (typically 1.8 to 5.5 volts DC) and is typically activated using electronic components such as a transistor, FET amplifier, or a relay to apply the amount of voltage. This high voltage requirement is typically caused from the usage of springs internally to create a "normally closed" or "normally open" valve. The energy required to overcome the spring strength requires higher voltage, more energy and more electromagnetic material in order to activate the solenoid. Unfortunately, this voltage and current requirement results in the need for additional components in order to enable existing solenoid valves to be used in applications having microcontrollers, small single board computers, and the like.

Therefore, a need exists for novel fluid control valves. There is a further need for novel fluid control valves which have reduced voltage and current requirements. Finally, there exists a need for novel fluid control valves that do not require additional electronic components, such as a transistor, FET amplifier, or a relay, in order to operate.

BRIEF SUMMARY OF THE INVENTION

A new solenoid valve device for selectively interrupting controlling fluid communication of any substance that continually deforms (flows) under an applied shear stress including liquids, gases, plasmas and, plastic solids is described by example herein. In some embodiments, the device may function as a normally-closed type of valve which blocks or prevents communication of fluids through the device while in a default state. In some embodiments, the device may include a body having a first fluid conduit and a second fluid conduit. A chamber may be disposed within the body which may couple the first fluid conduit and a second fluid conduit together in fluid communication. A valve seat may be positioned within the chamber and all fluid passing through the chamber may be directed through the valve seat so that fluid communication between the first fluid conduit and a second fluid conduit is provided through the valve seat. A seal element may be movably positioned within the chamber and the seal element may be movable between a first position and a second position. A body magnet may be in magnetic communication with the seal element and the magnetic communication may motivate the seal element into the first position in which the seal element is in contact with the valve seat thereby blocking fluid communication through the valve seat. An electromagnet, which when provided electricity, may also be in magnetic communication with the seal element. The magnetic communication of the electromagnet may overcome the magnetic communication of the body magnet and motivate the seal element into the second position in which the seal element is not in contact with the valve seat thereby allowing fluid communication through the valve seat.

In further embodiments, the device may function as a normally-open type of valve which allows or enables communication of fluids through the device while in a default state. In further embodiments, the device may include a body having a first fluid conduit and a second fluid conduit. A chamber may be disposed within the body which may couple the first fluid conduit and a second fluid conduit together in fluid communication. A valve seat may be positioned within the chamber and all fluid passing through the chamber may be directed through the valve seat so that fluid communication between the first fluid conduit and a second fluid conduit is provided through the valve seat. A seal element may be movably positioned within the chamber and the seal element may be movable between a first position and a second position. A body magnet may be in magnetic communication with the seal element and the magnetic communication may motivate the seal element into the second position in which the seal element is not in contact with the valve seat thereby allowing fluid communication through the valve seat. An electromagnet, which when provided electricity, may also be in magnetic communication with the seal element. The magnetic communication of the electromagnet may overcome the magnetic communication of the body magnet and motivate the seal element into the first position in which the seal element is in contact with the valve seat thereby blocking fluid communication through the valve seat.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
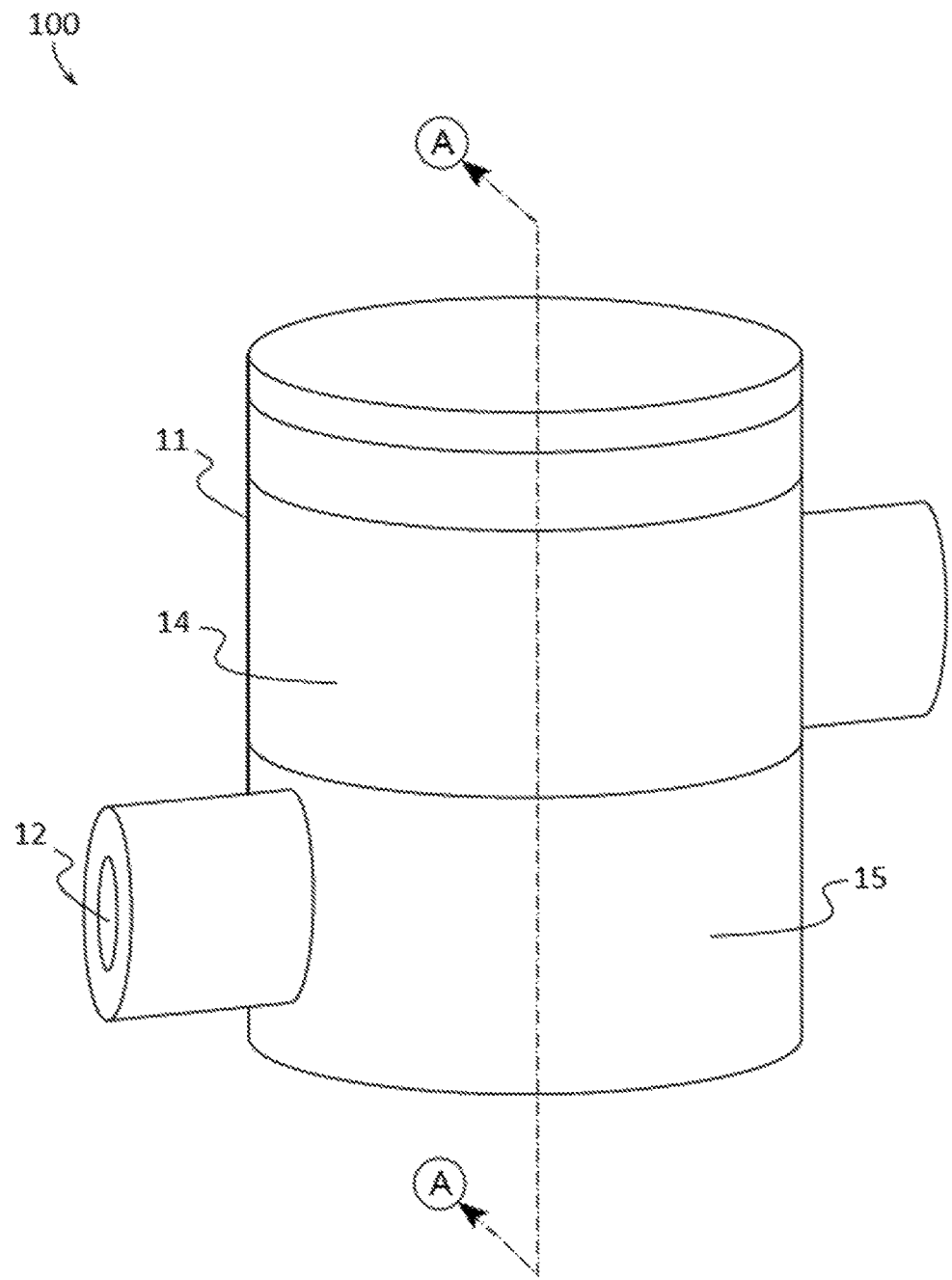
FIG. 1 shows a perspective view of an example of a solenoid valve device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

New fluid control solenoid valves are discussed herein. The valves may be used to control the communication of fluids which includes any substance that continually deforms (flows) under an applied shear stress including liquids, gases, plasmas and, plastic solids. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
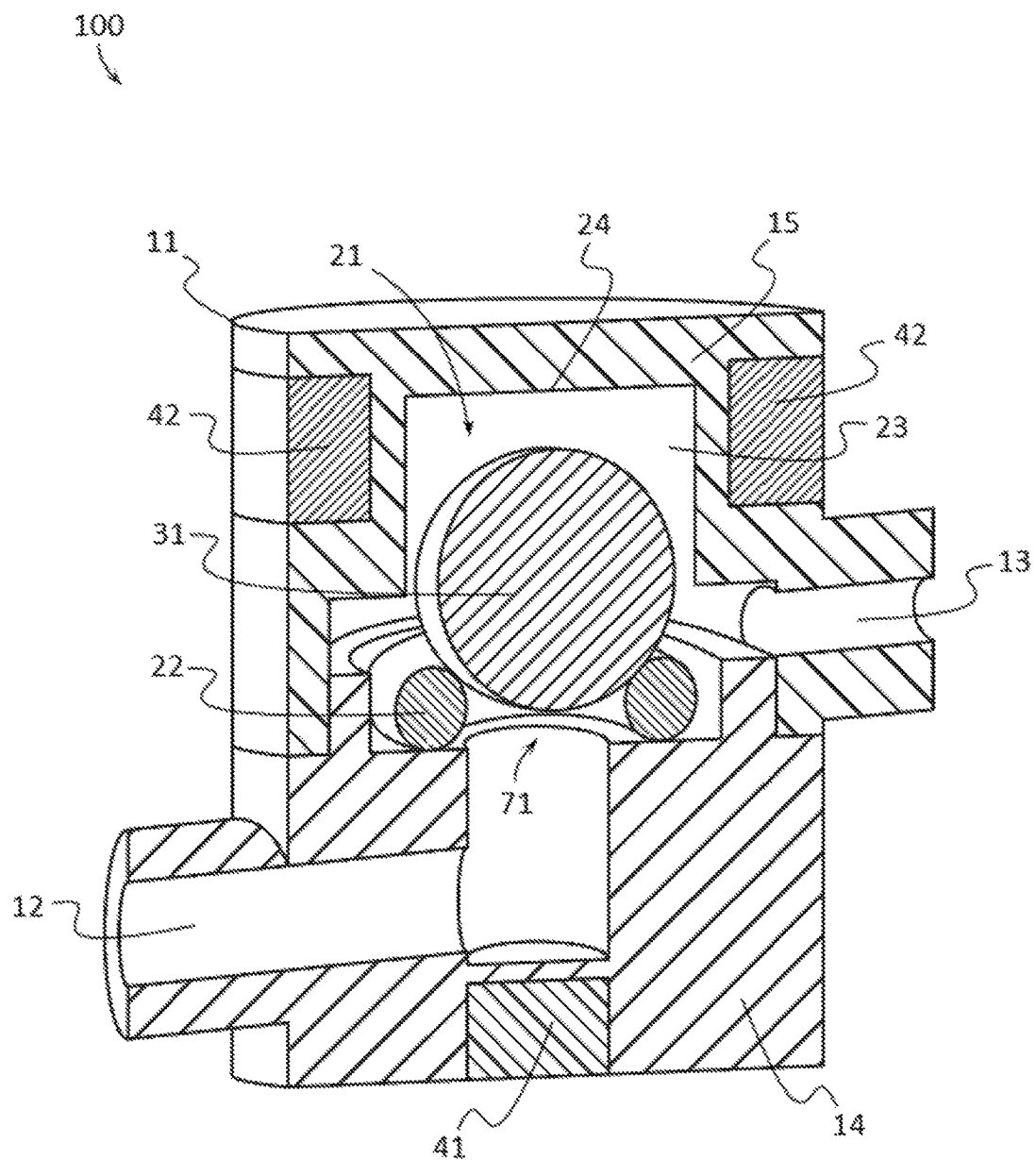
FIG. 2 illustrates a sectional, through line A-A shown in FIG. 1, elevation view of an example of a solenoid valve device in which fluid communication through the device is prevented according to various embodiments described herein.
Figure 3:
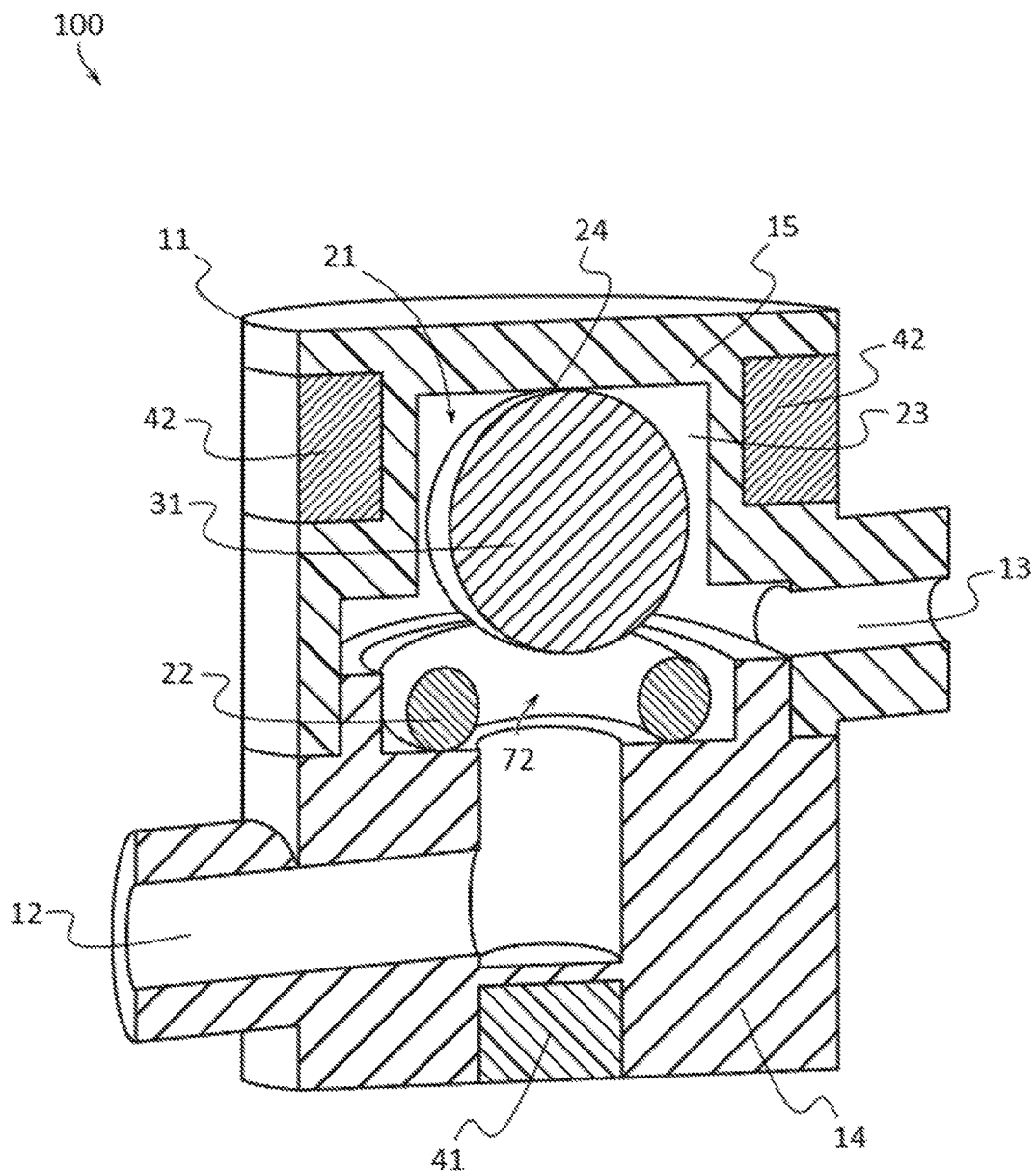
FIG. 3 shows a sectional, through line A-A shown in FIG. 1, elevation view of an example of a solenoid valve device in which fluid communication through the device is allowed according to various embodiments described herein.
Figure 4:
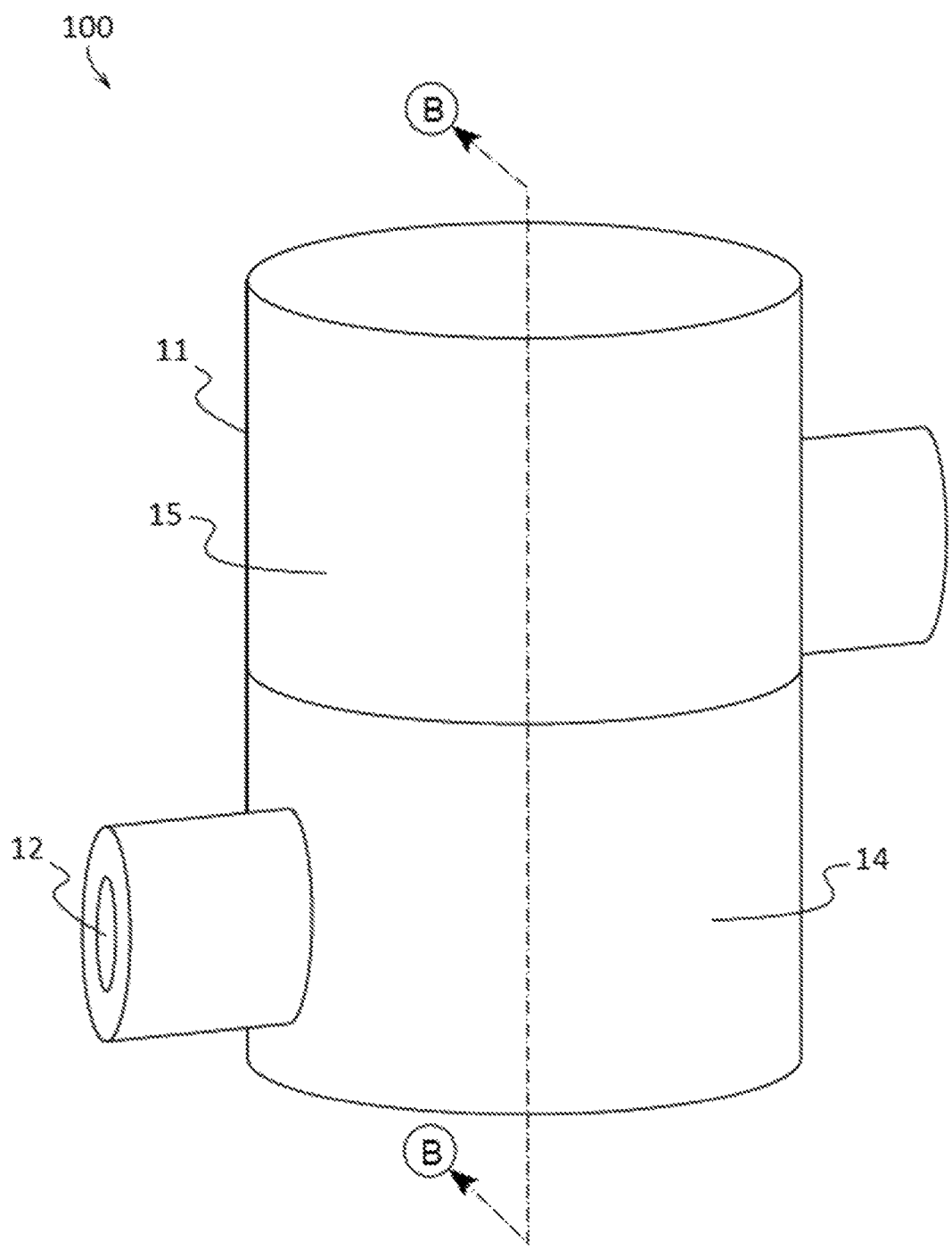
FIG. 4 shows a perspective view of an alternative example of a solenoid valve device according to various embodiments described herein.
Figure 5:
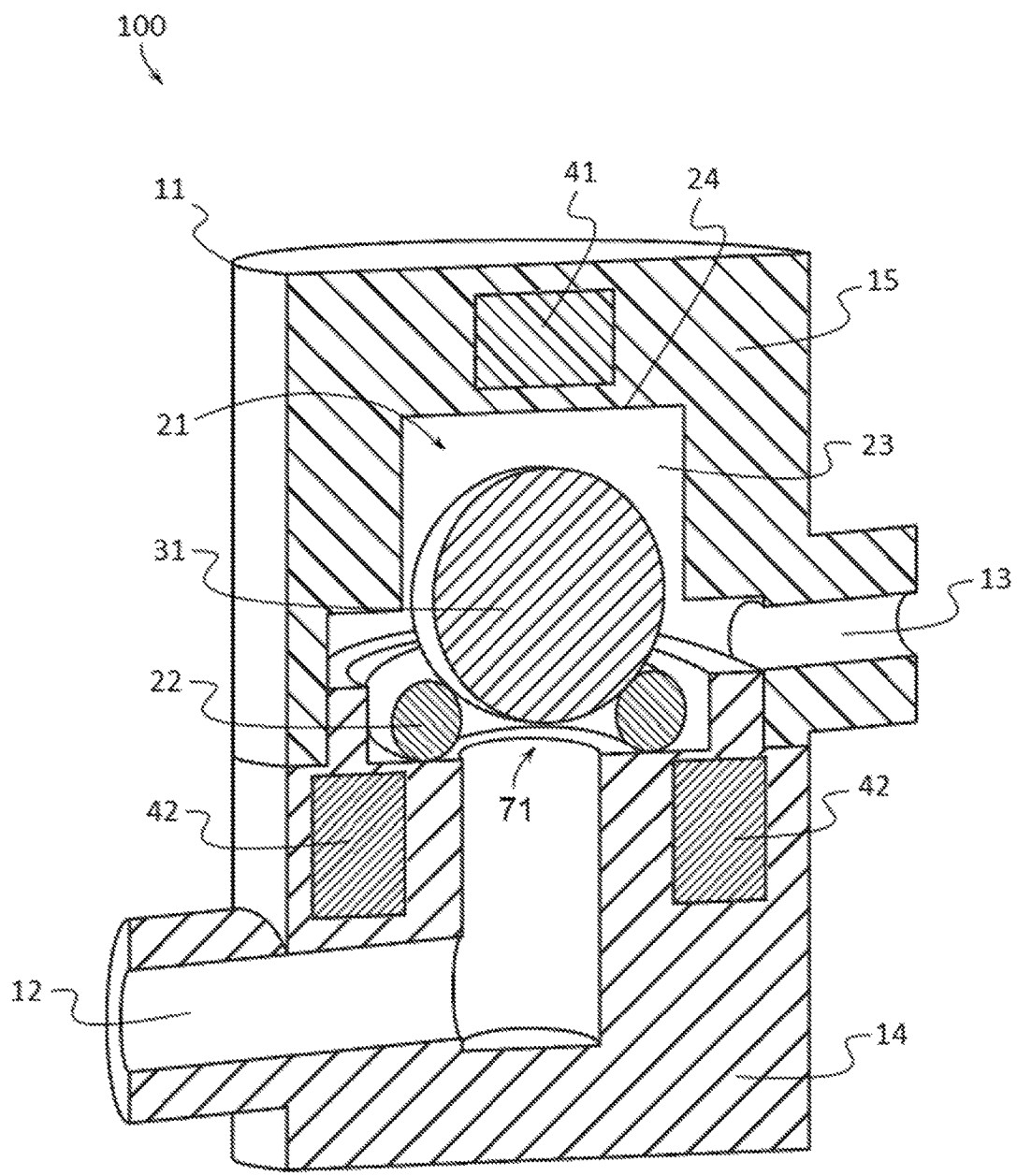
FIG. 5 illustrates a sectional, through line B-B shown in FIG. 4, elevation view of an example of a solenoid valve device in which fluid communication through the device is prevented according to various embodiments described herein.
Figure 6:
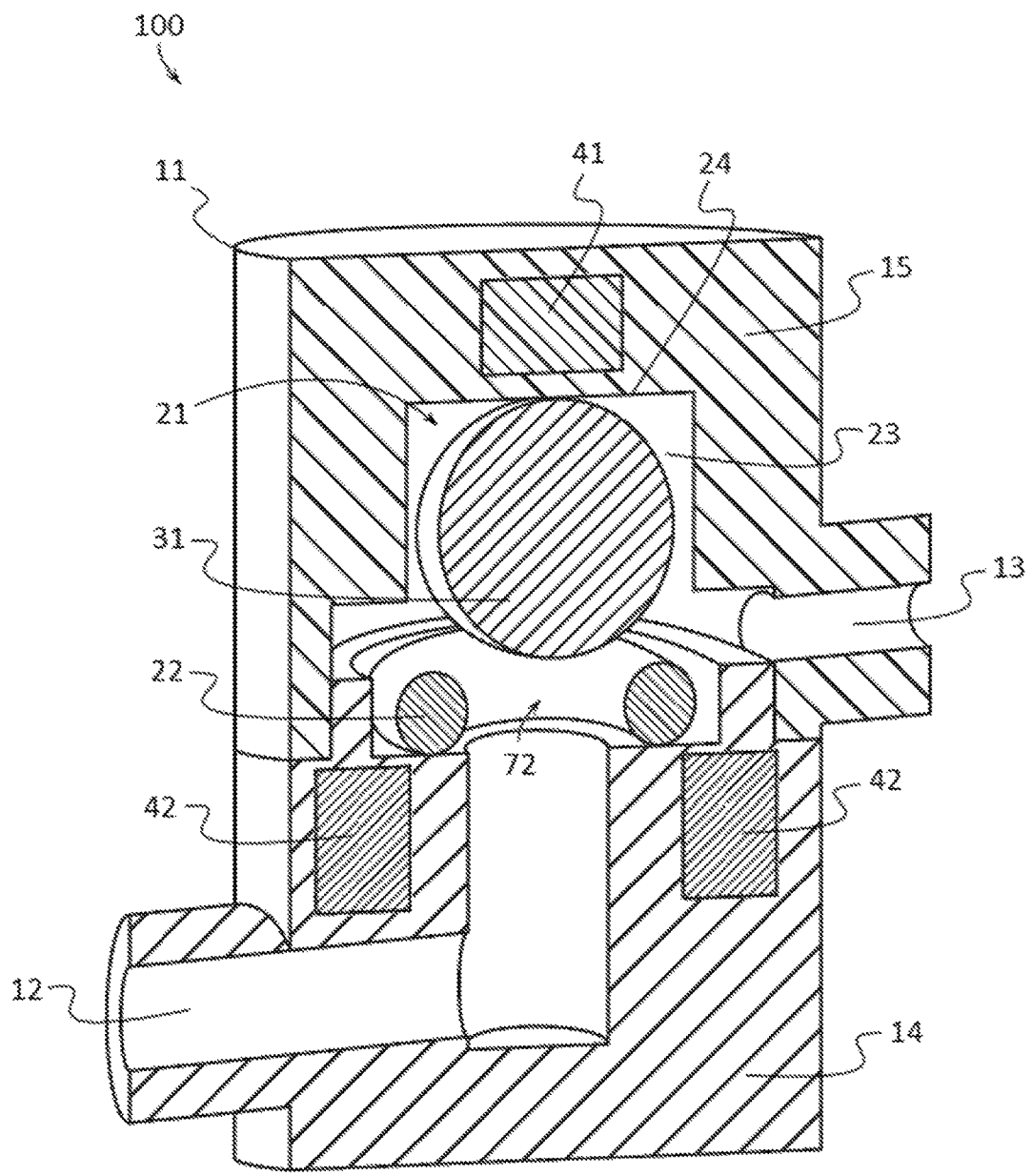
FIG. 6 shows a sectional, through line B-B shown in FIG. 4, elevation view of an example of a solenoid valve device in which fluid communication through the device is allowed according to various embodiments described herein.

The present invention will now be described by example and through referencing the appended figures representing preferred and alternative embodiments. FIGS. 1-6 depict examples of a solenoid valve device ("the device") 100 which may be configured to control communication of fluids through the body 11 of the device 100 according to various embodiments described herein. In some embodiments and as shown in FIGS. 1-3, the device 100 may function as a normally-closed type of valve which blocks or prevents communication of fluids through the body 11 in its default state. In other embodiments and as shown in FIGS. 4-6, the device 100 may function as a normally-open type of valve which allows or enables communication of fluids through the body 11 in its default state.

Turning now to the example of FIGS. 1-3, in some embodiments the device 100 may comprise a body 11 having a first fluid conduit 12 and a second fluid conduit 13. A chamber 21 may be disposed within the body 11 which may couple the first fluid conduit 12 and a second fluid conduit 13 together in fluid communication. A valve seat 22 may be positioned within the chamber 21 and all fluid passing through the chamber 21 may be directed through the valve seat 22 so that fluid communication between the first fluid conduit 12 and a second fluid conduit 13 is provided through the valve seat 22. A seal element 31 may be movably positioned within the chamber 21 and the seal element 31 may be movable between a first position 71 (FIG. 2) and a second position 72 (FIG. 3). A body magnet 41 may be in magnetic communication with the seal element 31 and the magnetic communication may motivate the seal element 31 into the first position 71 in which the seal element 31 is in contact with the valve seat 22 thereby blocking fluid communication through the valve seat 22. An electromagnet 42, which when provided electricity, may also be in magnetic communication with the seal element 31. The magnetic communication of the electromagnet 42 may overcome the magnetic communication of the body magnet 41 and motivate the seal element 31 into the second position 72 in which the seal element 31 is not in contact with the valve seat 22 thereby allowing fluid communication through the valve seat 22.

Optionally, the body 11 may be divided into one or more sections such as a first section 14 and a second section 15. A first section 14 may comprise one or more first fluid conduits 12 and a second section 15 may comprise one or more second fluid conduits 13. In some embodiments, one or more of the sections 14, 15, may be removably coupled together such as with threading or other removable coupling method. In other embodiments, one or more of the sections 14, 15, may be coupled together with adhesives, threaded fasteners, rivet type fasteners, or any other coupling method. In still further embodiments, one or more of the sections 14, 15, may be coupled together by being integrally formed or molded together.

The body 11 may be made from any suitable material which may not react or be dissolved by fluids which are to be communicated through the device 100. In some embodiments, the body may be made from aluminum, aluminum alloys, stainless steel, copper alloys, any other type of metal or metal alloy which is preferably non-ferromagnetic, any type of ceramic, earthenware, natural stone, synthetic stone, various types of hard plastics, such as nylon, acrylic, uPVC, HDPE, melamine, hard rubbers, fiberglass, carbon fiber, resins, such as epoxy resin, wood or any other material including combinations of materials that are substantially rigid any suitable for conducting fluids. In alternative embodiments, the body 11 may be made from any suitable rigid material which is able to accommodate pressure exerted by the fluid and portions of the body 11, such as those forming the chamber 21, first fluid conduit 12, and second fluid conduit 13, may be coated or covered with a material which may not react or be dissolved by fluids which are to be communicated through the device 100.

The chamber 21 may be formed into the body 11, such as into a first section 14, second section 15, and/or one or more other sections. The chamber 21 may couple a first fluid conduit 12 and a second fluid conduit 13 together while also containing the seal element 31. In some embodiments, the seal element 31 may be movably coupled within the chamber 21 so that the seal element 31 may move within the chamber 21. The chamber 21 may comprise a chamber wall 23 which may guide movement of the seal element 31 and also a chamber terminus 24 which may provide the maximum limit that the seal element 31 may move away from the valve seat 22.

The valve seat 22 may form the interface between the first fluid conduit 12 and the second fluid conduit 13. A valve seat 22 may be positioned or formed within the chamber 21 and all fluid passing through the chamber 21 may be directed through the valve seat 22 so that fluid communication between the first fluid conduit 12 and a second fluid conduit 13 is provided through the valve seat 22. Portions of the valve seat 22 are configured to be complementary in shape to portions of the seal element 31 which are configured to contact the valve seat 22. In this manner, when the valve seat 22 and seal element 31 are contacting each other, the portions which are in contact may form a seal which is able to prevent the communication of fluid between the conduits 12, 13. In some embodiments, a valve seat 22 may be formed by portions of the body 11 such as portions of a first section 14 and/or second section 15 which form the chamber 21. In further embodiments, a valve seat 22 may be formed by circular or annular shaped portions of the body 11 such as portions of a first section 14 and/or second section 15 which form the chamber 21 thereby forming a circular or annular shaped valve seat 22. In still further embodiments, a valve seat 22 may comprise a flexible portion of material, such as a gasket, o-ring, and the like, which may be coupled to the body within the chamber 21.

In some embodiments, a valve seat 22 may be formed by a torus which may be formed by revolving a circle in three-dimensional space about an axis coplanar with the circle so that the revolution does not touch the circle or a solid torus which may be formed by revolving a disk in three-dimensional space about an axis coplanar with the circle so that the revolution does not touch the circle. By configuring a valve seat 22 as a torus or solid torus, an annular shaped valve seat 22 may be formed.

For example and as shown in FIGS. 2, 3, 5, and 6, a valve seat 22 may be formed by an o-ring which may be a mechanical gasket in the shape of a torus which may be made of a material that may not react or be dissolved by fluids which are to be communicated through the device 100. The seal element 31 may be spherical in shape with a diameter that is greater than the inside diameter of the valve seat 22 so that when the valve seat 22 and seal element 31 are contacting each other, the portions which are in contact may form an annular seal which is able to prevent the communication of fluid between the conduits 12, 13. In alternative embodiments, a seal element 31 may be configured with any shape that is able to seal with a valve seat 22 to prevent or block fluid communication through the valve seat 22 when portions of the seal element 31 contact portions of the valve seat 22.

In an alternative example, the valve seat 22 may be formed by an o-ring and the seal element 31 may be generally conical or ovoid in shape with a diameter that fits within inside diameter of the valve seat 22 and a diameter that is greater than the inside diameter of the valve seat 22 so that when the valve seat 22 and seal element 31 are contacting each other, the portions which are in contact may form an annular seal which is able to prevent the communication of fluid between the conduits 12, 13.

In a further example, the valve seat 22 may be formed by an o-ring and the seal element 31 may be generally planar in shape with a diameter that is greater than the inside diameter of the valve seat 22 so that when the valve seat 22 and seal element 31 are contacting each other, the portions which are in contact may form an annular seal which is able to prevent the communication of fluid between the conduits 12, 13.

In a further example, the valve seat 22 may be formed as a triangular shape into portions of the body 11 forming the chamber 21 and the seal element 31 may have generally triangular prism shape so that when the valve seat 22 and seal element 31 are contacting each other, the portions which are in contact may form an annular seal which is able to prevent the communication of fluid between the conduits 12, 13.

In further embodiments, the portions of the valve seat 22 and portions of the seal element 31 may be configured in any complementary shape so that when the portions of the seal element 31 and the portions of the valve seat 22 contact each other the portions which are in contact may form a seal which is able to prevent the communication of fluid between a first fluid conduit 12 and a second fluid conduit 13. It is not intended herein to mention all the possible shape alternatives or equivalent forms that a valve seat 22 and complementary shaped seal element 31 may be configured with. It is understood that the terms and proposed shapes used herein are merely descriptive, rather than limiting, and that various changes, such as to size and shape, may be made without departing from the spirit or scope of the invention.

The seal element 31 may be made from a magnetic material that is preferably ferromagnetic. In some embodiments, the seal element 31 may be made from or comprise a magnetic material which may be attracted to a magnet such as iron, nickel, cobalt and manganese. In other embodiments, a seal element 31 may be made from ferrite, ferric oxide, manganese-zince ferrite, nickel-zinc ferrite, strontium ferrite, cobalt ferrite, barium ferrite, magnetic alloys such as alnico, comol, hypernom, iron-silicon magnet alloys, magnet steel, chromindur, silmanal, platinax, bismanol, cobalt-platinum alloys, chromium-manganese antimonide, ultra-mag, vectolite, magnadur, lodex, awaruite, wairauite, rare earth magnets such as samarium-cobalt, cesium-cobalt, neodymium-iron-boron, metallic oxides such as magnetite, ulvospinel, hematite, ilmenite, maghemite, jacobsite, metallic sulfides such as pyrrhotite, greigite, troilite, metallic oxyhydroxides such as goethite, lepidocrocite, feroxyhyte, metal alloys containing metals such as iron, nickel, cobalt, or any other suitable magnetic material that is capable of magnetically adhering to another magnetic material.

The device 100 may comprise one or more body magnets 41 which may be disposed in and/or coupled to the body 11 so that the body magnets 41 may be in magnetic communication with the seal element 31 within the chamber 21. A body magnet 41 may be made from any suitable magnetic material which is able to function as a permanent magnet. In some embodiments and as shown in FIGS. 2 and 3, the magnetic communication provided by the body magnet 41 may motivate the seal element 31 into a first position 71 (FIG. 2) in which the seal element 31 is in contact with the valve seat 22 thereby blocking fluid communication through the valve seat 22.

The device 100 may further comprise one or more electromagnets 42 which may be disposed in and/or coupled to the body 11 so that the electromagnets 42, when provided electricity, may also be in magnetic communication with the seal element 31 within the chamber 21. An electromagnet 42 may be a type of magnet in which the magnetic field is produced by an electric current. The magnetic field disappears when the current is turned off. For example, an electromagnet 42 may comprise a number of closely spaced turns of wire that create the magnetic field when an electric current runs through them. The wire turns may be wound around a magnetic core made from a ferromagnetic or ferrimagnetic material such as iron and the magnetic core may concentrate the magnetic flux and make the electromagnet 42 a more powerful magnet.

In some embodiments and as shown in FIGS. 2 and 3, when the electromagnet 42 is provided electricity, the magnetic communication provided to the seal element 31 by the electromagnet 42 may overcome the magnetic communication of the body magnet 41 to motivate the seal element 31 into the second position 72 (FIG. 3) in which the seal element 31 is not in contact with the valve seat 22 thereby allowing fluid communication through the valve seat 22. In this manner the device 100 may be configured as a normally closed type of valve so that when the electromagnet 42 is not provided power, the body magnet 41 may motivate or maintain the seal element 31 in contact with the valve seat 22 thereby blocking fluid communication through the valve seat 22 in its default or unpowered state. The device 100 may then be changed out of its default state or opened by providing electricity to the electromagnet 42 to provide magnetic communication to the seal element 31 which is sufficient to overcome magnetic communication provided by the body magnet 41 to motivate the seal element 31 out of the first position 71 (FIG. 2) and into the second position 72.

In some embodiments, when the electromagnet 42 is provided electricity, the magnetic communication provided to the seal element 31 by the electromagnet 42 may overcome the magnetic communication of the body magnet 41 to motivate the seal element 31 into a position between first position 71 and the second position 72 (FIG. 3) in which the seal element 31 is not in contact with the valve seat 22 thereby allowing the seal element 31 to control the amount of fluid communication through the valve seat 22. In this manner the device 100 may be configured as an adjustable type of valve with the electromagnet 42 and the body magnet 41 configured to motivate the seal element 31 into and out of proximity and contact with the valve seat 22 thereby controlling the pressure and volume of fluid that is communicated through the valve seat 22. For example, by motivating the seal element 31 a greater distance away from the valve seat 22, the pressure and volume of fluid that is communicated through the valve seat 22 may be increased. Conversely, by motivating the seal element 31 a lesser distance away from the valve seat 22, the pressure and volume of fluid that is communicated through the valve seat 22 may be decreased.

In some embodiments, the electromagnet 42 and the body magnet 41 may be disposed on opposite sides of the valve seat 22. In alternative embodiments, the electromagnet 42 and the body magnet 41 may be disposed on the same side of the valve seat 22. In further embodiments, the seal element 31 and the body magnet 41 may be disposed on opposite sides of the valve seat 22. In alternative embodiments, the seal element 31 and the body magnet 41 may be disposed on the same sides of the valve seat 22.

FIGS. 4-6 show an alternative example of a solenoid valve device 100 which may function as a normally-open type of valve which allows or enables communication of fluids through the body 11 in its default state according to various embodiments described herein. In this and in some embodiments, the device 100 may comprise a body 11 having a first fluid conduit 12 and a second fluid conduit 13. A chamber 21 may be disposed within the body 11 which may couple the first fluid conduit 12 and a second fluid conduit 13 together in fluid communication. A valve seat 22 may be positioned within the chamber 21 and all fluid passing through the chamber 21 may be directed through the valve seat 22 so that fluid communication between the first fluid conduit 12 and a second fluid conduit 13 is provided through the valve seat 22. A seal element 31 may be movably positioned within the chamber 21 and the seal element 31 may be movable between a first position 71 (FIG. 5) and a second position 72 (FIG. 6). A body magnet 41 may be in magnetic communication with the seal element 31 and the magnetic communication may motivate the seal element 31 into the second position 72 in which the seal element 31 is not in contact with the valve seat 22 thereby allowing fluid communication through the valve seat 22. An electromagnet 42, which when provided electricity, may also be in magnetic communication with the seal element 31. The magnetic communication of the electromagnet 42 may overcome the magnetic communication of the body magnet 41 and motivate the seal element 31 into the first position 71 in which the seal element 31 is in contact with the valve seat 22 thereby blocking fluid communication through the valve seat 22.

In this manner the device 100 may be alternatively configured as a normally open type of valve so that when the electromagnet 42 is not provided power, the body magnet 41 may motivate the seal element 31 into the second position 72 (FIG. 6) to prevent the seal element 31 from contacting the valve seat 22 thereby allowing fluid communication through the valve seat 22 in its default or unpowered state. The device 100 may then be changed out of its default state or closed by providing electricity to the electromagnet 42 to provide magnetic communication to the seal element 31 which is sufficient to overcome magnetic communication provided by the body magnet 41 to motivate the seal element 31 out of the second position 72 and into the first position 71 (FIG. 5).

Figure 7:
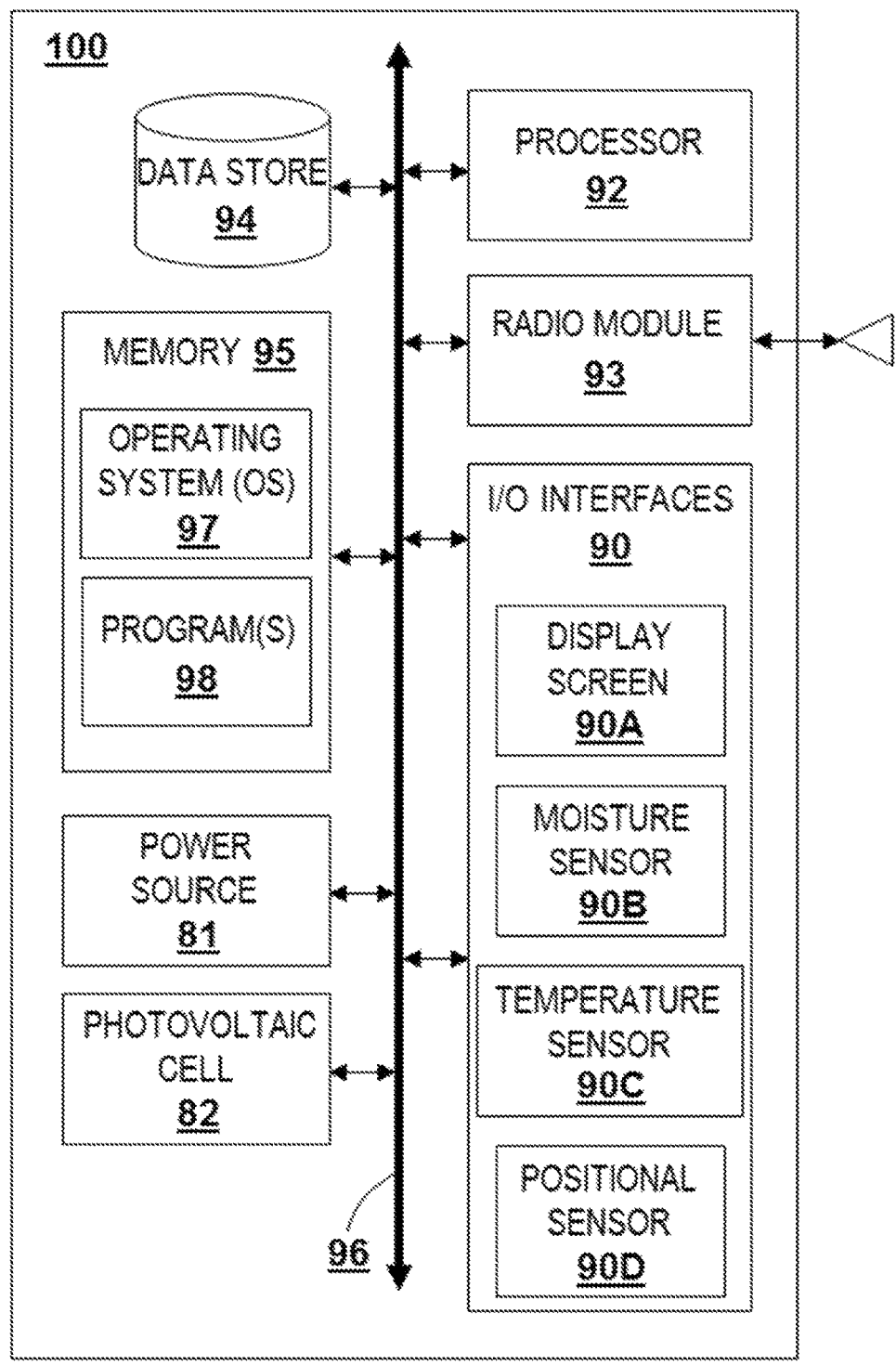
FIG. 7 illustrates a block diagram of one example of a solenoid valve device comprising one or more optional components according to various embodiments described herein.

FIG. 7 illustrates a block diagram of one example of a solenoid valve device 100 comprising one or more optional components according to various embodiments described herein. In some embodiments and in the present example, the device 100 can be a digital device that, in terms of hardware architecture, optionally comprises a processor 92, input/output (I/O) interfaces 90, a radio module 93, a data store 94, memory 95, power source 81, and/or one or more photovoltaic cells 82. It should be appreciated by those of ordinary skill in the art that FIG. 7 depicts an example of the device 100 in an oversimplified manner, and a practical embodiment may include additional components or elements and suitably configured processing logic to support known or conventional operating features that are not described in detail herein.

The components and elements (90, 92, 93, 94, 95, 81, and 82) are communicatively coupled via a local interface 96. The local interface 96 can be, for example but not limited to, one or more buses or other wired or wireless connections, as is known in the art. The local interface 96 can have additional elements, which are omitted for simplicity, such as controllers, buffers (caches), drivers, repeaters, and receivers, among many others, to enable communications. Further, the local interface 96 may include address, control, and/or data connections to enable appropriate communications among the aforementioned components.

In preferred embodiments, a local interface 96 may be an integrated circuit (IC) that integrates one or more components (90, 92, 93, 94, and 95) on a single chip sometimes called a system on a chip (SoC) or system on chip (SOC). In further preferred embodiments, a local interface 96 and one or more components (90, 92, 93, 94, and 95) may be a microcontroller (or MCU, short for microcontroller unit) which may be a small computer(SoC) on a single integrated circuit containing a processor 92, memory 95, and programmable input/output interfaces or peripherals 90. Program memory in the form of Ferroelectric RAM, NOR flash or OTP ROM is also often included on chip, as well as a typically small amount of RAM. Microcontrollers are designed for embedded applications, in contrast to the microprocessors used in personal computers or other general purpose applications consisting of various discrete chips. Microcontrollers are used in automatically controlled products and devices, such as automobile engine control systems, implantable medical devices, remote controls, office machines, appliances, power tools, toys and other embedded systems. By reducing the size and cost compared to a design that uses a separate microprocessor, memory, and input/output devices, microcontrollers make it economical to digitally control even more devices and processes. Mixed signal microcontrollers are common, integrating analog components needed to control non-digital electronic systems.

In alternative embodiments, a local interface 96 may comprise a printed circuit board (PCB) which mechanically supports and electrically connects electronic components including MCU's using conductive tracks, pads and other features etched from copper sheets laminated onto a non-conductive substrate. PCBs can be single sided (one copper layer), double sided (two copper layers) or multi-layer. Conductors on different layers may be connected with plated-through holes called vias. In further embodiments, a control board 96 may comprise a printed circuit assembly (PCA), printed circuit board assembly or PCB assembly (PCBA), a circuit card assembly (CCA), or a backplane assembly, or any other suitable electrical connection and communication method including standard wiring and the like.

The processor 92 is a hardware device for executing software instructions. The processor 92 can be any custom made or commercially available processor, a central processing unit (CPU), an auxiliary processor among several processors, a semiconductor-based microprocessor (in the form of a microchip or chip set), or generally any device for executing software instructions. When in operation, the processor 92 is configured to execute software stored within the memory 95, to communicate data to and from the memory 95, and to generally control operations of the device 100 pursuant to the software instructions. In an exemplary embodiment, the processor 92 may include a mobile optimized processor such as optimized for power consumption and mobile applications.

The I/O interfaces 90 can be used to input and/or output information and power. In some embodiments, I/O interfaces 90 may include one or more turnable control knobs, depressible button type switches, a key pad, slide type switches, dip switches, rocker type switches, rotary dial switches, numeric input switches or any other suitable input which a user may interact with to provide input. In further embodiments, I/O interfaces 90 may include one or more light emitting elements or other display device, e.g., a LED (light emitting diodes), a speaker, or any other suitable device for outputting or displaying information. The I/O interfaces 90 can also include, for example, a serial port, a parallel port, a small computer system interface (SCSI), an infrared (IR) interface, a radio frequency (RF) interface, a universal serial bus (USB) interface, and the like.

In some embodiments, a device 100 may optionally comprise one or more I/O interfaces 90 which may be a display screen 90A. A display screen 90A may be configured to provide visual information to a user and optionally to receive input from a user such as a touch screen display. A display screen 90A may comprise a Liquid crystal display (LCD), Light-emitting diode display (LED), Electroluminescent display (ELD), Electronic paper, E Ink, Plasma display panel (PDP), Cathode ray tube display (CRT), High-Performance Addressing display (HPA), Thin-film transistor display (TFT), Organic light-emitting diode display (OLED), Surface-conduction electron-emitter display (SED), Laser TV, Carbon nanotubes, Quantum dot display, and/or Interferometric modulator display (IMOD).

In some embodiments, a device 100 may optionally comprise one or more I/O interfaces 90 which may be a moisture sensor 90B. A moisture sensor 90B may be configured to provide moisture data which may be used by the processor 92 such as to control the amount of power provided to an electromagnet 42 (FIGS. 2, 3, 5, 6). For example, when the moisture sensor 90B detects a level of moisture, such as in an amount of soil, below or above a certain threshold, the processor 92 may control an electromagnet 42 to allow or block, respectively, the fluid communication of the device 100. A moisture sensor 90B may comprise a Frequency Domain Reflectometry (FDR) type of sensor, a Time Domain Transmission (TDT) and/or Time Domain Reflectometry (TDR) type of sensor, a Neutron moisture gauge type of sensor, a Soil resistivity type of sensor, a Galvanic cell type of sensor, or any other type of moisture sensor configured to electrically communicate moisture information.

In some embodiments, a device 100 may optionally comprise one or more I/O interfaces 90 which may be a temperature sensor 90C. A temperature sensor 90C may be configured to provide temperature data which may be used by the processor 92 such as to control the amount of power provided to an electromagnet 42 (FIGS. 2, 3, 5, 6). For example, when the temperature sensor 90C detects a temperature, such as an ambient temperture, below or above a certain threshold, the processor 92 may control an electromagnet 42 to allow or block the fluid communication of the device 100. A temperature sensor 90C may comprise a thermocouple, a resistive temperature device (RTDs, thermistors), an infrared temperature sensor, a bimetallic device, a liquid expansion device, a molecular change-of-state device, a silicon diode, or any other type of temperature sensor configured to electrically communicate temperature information.

In some embodiments, a device 100 may optionally comprise one or more I/O interfaces 90 which may be a positional sensor 90D. A positional sensor 90D may be configured to provide position data which may be used by the processor 92 such as to control the amount of power provided to an electromagnet 42 (FIGS. 2, 3, 5, 6). In preferred embodiments, a positional sensor 90D may be used to detect the position of a seal element 31 within the chamber 21. When the positional sensor 90D detects that the seal element 31 is closer to a body magnet 41, the processor 92 may provide a greater amount of electricity to an electromagnet 42 to overcome the greater magnetic communication the body magnet 41 may exert on the seal element 31. When the positional sensor 90D detects that the seal element 31 is farther from a body magnet 41, the processor 92 may provide a lesser amount of electricity to an electromagnet 42 to overcome the lesser magnetic communication the body magnet 41 may exert on the seal element 31. In this way, the positional sensor 90D may allow the processor 92 to control the fluid communication of the device 100 in a power efficient manner. For example, a normally closed device 100 (FIGS. 1-3) may comprise a positional sensor 90D configured to detect when the seal element 31 is in the second position 72 and the processing unit 92 may decrease the amount of electricity provided to the electromagnet 42 when the seal element 31 is in the second position 72 since less electricity is required to overcome the magnetic communication of the body magnet 41 when the seal element 31 is further from the body magnet 41. Alternatively, a normally open device 100 (FIGS. 4-6) may comprise a positional sensor 90D configured to detect when the seal element 31 is in the first position 71 and the processing unit 92 may decrease the amount of electricity provided to the electromagnet 42 when the seal element 31 is in the first position 71 since less electricity is required to overcome the magnetic communication of the body magnet 41 when the seal element 31 is further from the body magnet 41.

A positional sensor 90D may comprise a Hall effect sensor, pressure switch, electrical circuit, a read switch, a contact sensor, a button mount, an ambient light sensor, Capacitive transducer, Capacitive displacement sensor, Eddy-current sensor, Ultrasonic sensor, Grating sensor, Inductive non-contact position sensors, Laser Doppler Vibrometer (optical), Linear variable differential transformer (LVDT), Multi-axis displacement transducer, Photodiode array, Piezo-electric transducer (piezo-electric), Potentiometer, Proximity sensor (optical), Rotary encoder (angular), Seismic displacement pick-up, String potentiometer (also known as string pot., string encoder, cable position transducer), or any other suitable sensor to detect the position of a seal element 31 within the camber 21.

In further embodiments, a positional sensor 90D may be configured to detect the position of a seal element 31 within the chamber 21 which may be used by the processor 92 to control the amount of power provided to an electromagnet 42 (FIGS. 2, 3, 5, 6) to control the pressure and volume of fluid communicated through the device 100. In this way, the positional sensor 90D may allow the processor 92 to control the fluid communication of the device 100 by controlling the electricity provided to the electromagnet 42. In this manner the device 100 may be configured as an adjustable type of valve with the electromagnet 42 and the body magnet 41 configured to motivate the seal element 31 into and out of proximity and contact with the valve seat 22 thereby controlling the pressure and volume of fluid that is communicated through the valve seat 22. For example, by motivating the seal element 31 a greater distance away from the valve seat 22, the pressure and volume of fluid that is communicated through the valve seat 22 may be increased. Conversely, by motivating the seal element 31 a lesser distance away from the valve seat 22, the pressure and volume of fluid that is communicated through the valve seat 22 may be decreased.

An optional radio module 93 may enable wireless communication to an external access device or network through an antenna. A radio module 93 may comprise a wireless communication receiver and optionally a wireless communication transmitter. In some embodiments, a radio module 93 may operate on a cellular band and may communicate with or receive a Subscriber Identity Module (SIM) card or other wireless network identifier. Any number of suitable wireless data communication protocols, techniques, or methodologies can be supported by the radio module 93, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 94 may be used to store data. The data store 94 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 94 may incorporate electronic, magnetic, optical, and/or other types of storage media.

The memory 95 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 95 may incorporate electronic, magnetic, optical, and/or other types of storage media. Note that the memory 95 may have a distributed architecture, where various components are situated remotely from one another, but can be accessed by the processor 92. The software in memory 95 can include one or more software programs, each of which includes an ordered listing of executable instructions for implementing logical functions. In the example of FIG. 7, the software in the memory system 95 may include a suitable operating system (O/S) 97 and programs 98. An operating system 97 essentially controls the execution of input/output interface 90 functions, and provides scheduling, input-output control, file and data management, memory management, and communication control and related services. The operating system 97 may be, for example, LINUX (or another UNIX variant) and any Linux-kernel-based operating systems, Raspbian, Ubuntu, OpenELEC, RISC OS, Arch Linux ARM, OSMC (formerly Raspbmc) and the Kodi open source digital media center, Pidora (Fedora Remix), Puppy Linux, Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 98 may include various applications, add-ons, etc. configured to provide end user functionality.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The device 100 may optionally include a main memory, such as a random access memory (RAM) or other dynamic storage device (e.g., dynamic RAM (DRAM), static RAM (SRAM), and synchronous DRAM (SDRAM)), coupled to the control board 96 for storing information and instructions, sometimes called "firmware" that is written in codes such as "assembly", "C" and "Basic", to be executed by the processor 92. In addition, the main memory may be used for storing temporary variables or other intermediate information during the execution of instructions by the processor 92. The device 100 may further optionally include a read only memory (ROM) or other static storage device (e.g., programmable ROM (PROM), erasable PROM (EPROM), and electrically erasable PROM (EEPROM)) coupled to the control board 96 for storing static information and instructions for the processor 92.

In some embodiments, the device 100 may optionally comprise a power source 81 which may provide electrical power to any component (42, 90, 90A, 90B, 90C, 92, 93, 94, 95) of the device 100 that may require electrical power. A power source 81 may comprise a battery, such as a lithium ion battery, nickel cadmium battery, alkaline battery, or any other suitable type of battery, a fuel cell, a capacitor, a super capacitor or any other type of energy storing and/or electricity releasing device. In further embodiments, a power source 81 may comprise a power cord, kinetic or piezo electric battery charging device, and/or inductive charging or wireless power receiver. In alternative embodiments, electrical power may be supplied to any component (42, 90, 90A, 90B, 90C, 92, 93, 94, 95) of the device 100 that may require electrical power through a wired connection to a power source.

In some embodiments, the device 100 may optionally comprise one or more photovoltaic cells 82, such as a photovoltaic array, which may be configured to provide power to any component (42, 81, 90, 90A, 90B, 90C, 92, 93, 94, 95) of the device 100 that may require electrical power. A photovoltaic cell 82 may comprise any electrical device, such as a solar cell, that converts the energy of light directly into electricity by the photovoltaic effect, such as Crystalline silicon photovoltaic cells, Thin Film photovoltaic cells, Multi junction photovoltaic cells, Perovskite solar cells, Liquid inks, Quantum dot solar cells, Dye-sensitized solar cells, Photon upconversion and downconversion solar cells, Organic/polymer solar cells, Adaptive solar cells, and/or any other type of cell which converts the energy of light into electricity using the photovoltaic effect.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A solenoid valve devices for communicating a fluid, the device comprising:
   a. a body in communication with a first fluid conduit and a second fluid conduit;
   b. a chamber disposed within the body, wherein the chamber couples the first fluid conduit and the second fluid conduit together and the chamber having a longitudinal axis;
   c. a valve seat positioned within the chamber and in-between the first fluid conduit and the second fluid conduit thereby dividing the chamber into a chamber first half and a chamber second half, wherein fluid communication between the first fluid conduit and the second fluid conduit is provided through the valve seat, the fluid entering the chamber second half through the second fluid conduit and exiting the chamber first half through the first fluid conduit;
   d. a seal element made of a magnetic material, wherein the seal element is movably positioned within the chamber second half and movable between a first position and a second position along the longitudinal axis;
   e. a body magnet in magnetic communication with the seal element, wherein the magnetic communication provided by the body magnet motivates the seal element into the first position in which the seal element is in contact with the valve seat thereby blocking fluid flow through the valve seat, the body magnet, seal element, and valve seat being co-positioned longitudinally along the longitudinal axis and the body magnet being positioned to magnetically attract the seal element in the same direction as the fluid attempting to pass through the valve seat so that the seal element is normally in a closed first position preventing the passage of the fluid through the valve seat, the body magnet being in a fixed position such that the chamber first half is located between the seal element and the body magnet; and
   f. an internally located electromagnet disposed within the body of the solenoid valve device and fixed at a position opposite to the body magnet so that the seal element and valve seat are positioned in-between the body magnet and the electromagnet along the longitudinal axis, and wherein magnetic communication between the seal element and the electromagnet is configured to be greater than the magnetic communication provided by the body magnet to magnetically pull the seal element in an opposite direction relative to the fluid passing through the valve seat into the second position along the longitudinal axis so that the seal element is not in contact with the valve seat thereby allowing fluid communication through the valve seat.

2. The device of claim 1, wherein the valve seat is annular in shape.

3. The device of claim 1, wherein the seal element is spherical in shape.

4. The device of claim 1, wherein the seal element is a permanent magnet.

5. The device of claim 1, wherein the first fluid conduit and the second fluid conduit are transversely located relative to the longitudinal axis.

6. The device of claim 5, wherein fluid communication into and out of the chamber is in a direction perpendicular to the longitudinal axis.

7. The device of claim 1, further comprising a processing unit in electrical communication with the electromagnet, wherein the processing unit governs a supply of electricity to the electromagnet.

8. The device of claim 7, further comprising a positional sensor configured to detect when the seal element is in the second position; wherein the positional sensor is in electrical communication with the processing unit, and wherein the processing unit decreases the supply of electricity provided to the electromagnet when the seal element is in the second position.

9. The device of claim 8, wherein the positional sensor is a Hall effect sensor.

10. The device of claim 7, wherein the processing unit is in electrical communication with a battery power source and a photovoltaic cell.

* * * * *